June 14, 1966  V. D. MOLITOR  3,255,526
KNOCKOUT DIE

Filed Jan. 14 1965  2 Sheets-Sheet 1

INVENTOR.
VICTOR D. MOLITOR
BY
Van Valkenburgh & Lowe
ATTORNEYS

June 14, 1966
V. D. MOLITOR
3,255,526
KNOCKOUT DIE
Filed Jan. 14 1965
2 Sheets-Sheet 2
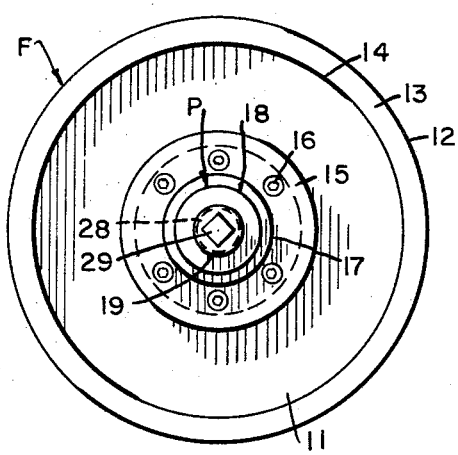
FIG. 4.
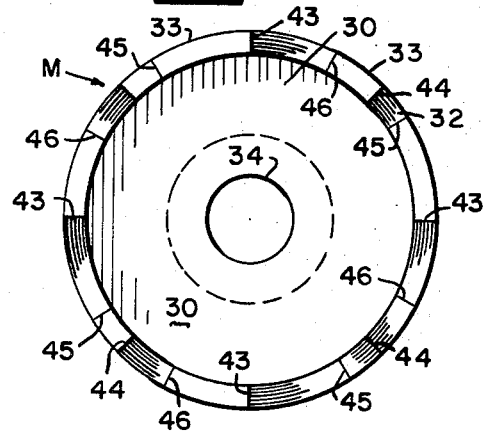
FIG. 5.
FIG. 6.
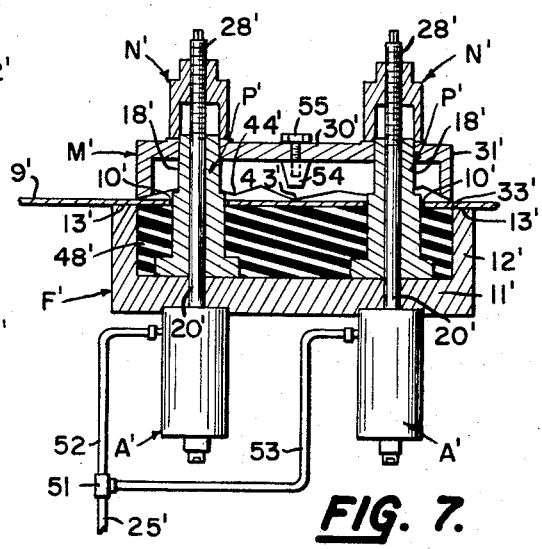
FIG. 8.
FIG. 9.
FIG. 7.
INVENTOR.
VICTOR D. MOLITOR
BY
Van Vackenburgh & Rowe
ATTORNEYS United States Patent Office 3,255,526
Patented June 14, 1966

3,255,526
KNOCKOUT DIE
Victor David Molitor, 2829 S. Santa Fe Drive,
Englewood, Colo.
Filed Jan. 14, 1965, Ser. No. 425,571
14 Claims. (Cl. 30—360)

This invention relates to cutters and dies adapted to form holes in sheet metal, and more particularly to hole forming dies of the type having opposing, closely fitting, male and female dies which forcibly move together to shear a hole through a sheet of metal placed between them. Such hole forming dies are commonly referred to as "knockout dies" and the invention will be hereafter called a "knockout die."

An object of the invention is to provide a novel and improved knockout die which is especially adapted to cut large diameter holes in sheet metal of the type which is very tough, easily work hardens and resists cutting and sawing operations ordinarily used to cut large diameter holes in metal sheets and plates.

Another object of the invention is to provide a novel and improved knockout die for cutting large diameter holes in tough sheet metal, of a material such as stainless steel, which is especially adapted to be held in a precisely aligned manner and to be subjected to a balanced axially-centered loading and strain as shearing and cutting through a metal sheet occurs.

Another object of the invention is to provide, in a knockout die for cutting holes in sheet metal, an improved construction of a serrated edge on one die which facilitates the cutting and shearing through a sheet of tough metal by cutting simultaneously only at a limited number of points about the periphery of the knockout hole.

Another object of the invention is to provide, in a knockout die for large diameter holes, an improved arrangement of guides between the male and female components of the die which is adapted to minimize the possibility of misalignment of the die components and of the components winding or twisting or binding as they move together.

Another object of the invention is to provide novel means for at least partially ejecting the blank cut from the sheet metal, which also assists in preventing binding of the blank on parts of the knockout die.

Another object of the invention is to provide a new and improved knockout die which can be precisely positioned for cutting large diameter holes in sheets of metal and is especially easy to use.

Other objects of the invention are to provide a novel and improved knockout die which is a compact, powerful, rugged and durable unit.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawings, in which:

FIG. 4 is an end view of the female portion of the die per se, but with a rubber filler block being removed to show parts otherwise hidden from view;

FIG. 5 is an opposing end view of the male portion of the die per se;

FIG. 6 is a layout view of a portion of the outer face of the arcuate cutter ring of the male die taken from the inside, to better illustrate the construction of the serrated cuting edge of the die;

FIG. 7 is a sectional plan view, similar to FIG. 2, but on a reduced scale, and illustrating an alternate construction of a die, especially adapted for cutting rectangular or elongated holes, and incorporating therein a dual actuating mechanism to facilitate operation of the die;

FIG. 8 is an end view of the female portion of the die illustrated in FIG. 7, but with a rubber filler block being removed to show parts otherwise hidden from view; and FIG. 9 is an opposing end view of the male portion of the die illustrated in FIG. 7.

Figure 1:
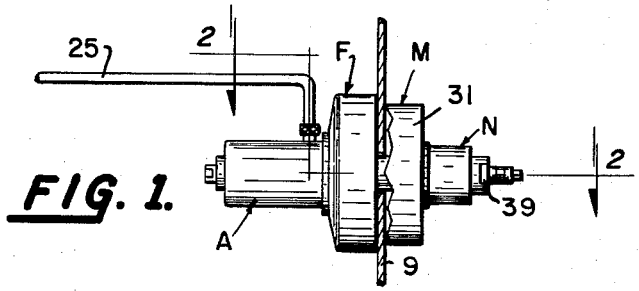
FIG. 1 is a side elevational view of an improved die for cutting circular holes, as it would appear when mounted upon a steel plate, as with the male and female sections being at opposite sides of the plate, the unit being held in position upon the plate by axially centered connective members extending through a small diameter, precut guide hole in the plate.
Figure 2:
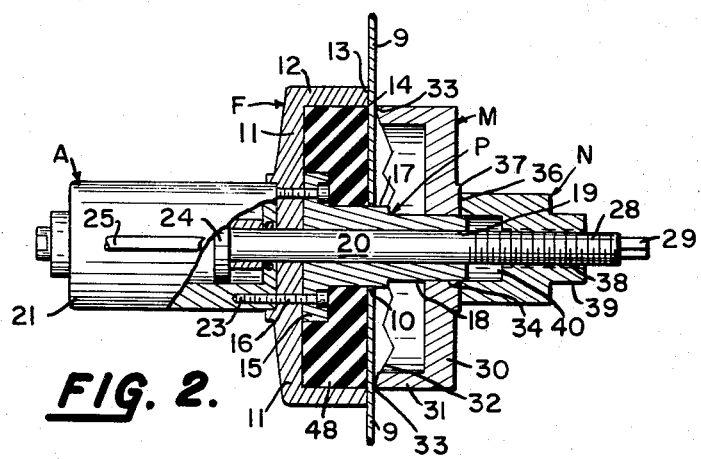
FIG. 2 is an offset section, taken along line 2—2 of FIG. 1, but on an enlarged scale and with portions broken away to show parts otherwise hidden from view.

Referring more particularly to the drawings, the improved knockout die is formed as a compact, easily handled, two-piece unit including a base portion which is built about a cup-shaped female die F and a cutter portion which is built about a mating, cup-shaped male die M. An axially centered guide P extends from the base of the female die, as will be described, and the operation of the cutting of a knockout hole in a metal plate 9 includes the steps of inserting the guide P through a pilot hole 10 in the metal plate 9 normally utilized for centering the die, connecting the male die M to the pull rod 20 at the opposite side of the plate, centering the dies to the proper position, if necessary, and pulling the male die through the plate and into the female die by a hydraulic actuator A.

The female die F is formed upon a comparatively heavy base disc 11 and includes a comparatively heavy cylindrical flange ring 12 outstanding from the periphery of the base disc. The outward end of this ring 12 is squared to form an abutment surface 13 which is adapted to press against plate 9 during a hole cutting operation to hold the surface of the plate flatly, while the knockout hole is being cut. A squared, sharp cutting edge 14 at the inner edge of this surface defines the edge of the knockout hole, and the surface 13 and its cutting edge 14 are machined and ground to selected tolerances and are hardened to resist the pressures induced by the shearing action of the male die cutting through a plate of tough metal as it moves into the female die. The disc 11 serves as a base for the axially centered guide P, a post-like member which extends from the inner face of the disc 11 a distance sufficient to permit its components to pass through pilot hole 10 in plate 9 and to engage the male die M. The guide post P includes a base flange 15 which lies against the face of the disc and is bolted thereto by a ring of bolts 16 which extend through a suitable circle of holes in the flange 15 and in the base 10 for connection with actuator A, as hereinafter described.

A cylindrical holding segment 17 extends from the flange 15 to a short distance beyond the plane of the ring surface 13 to extend through the pilot hole 10 of plate 9 when the surface 13 is abutting against a plate. It is contemplated that, in the use of the knockout die, the pilot hole 10 will be drilled or punched through the plate in any conventional manner, as a preliminary step to cutting a larger knockout hole therein. This hole 10 is preferably of a diameter to snugly fit the holding segment 17, if it can be accurately centered and located on the plate 9. However, if it cannot be sufficiently accurately located on the plate, its diameter should be larger than the diameter of the holding segment 17 and sufficient to permit the knockout die to be properly positioned upon the plate.

The guide post P includes a cylindrical guide segment 18, which is slightly smaller in diameter than the holding segment 17, but is axially aligned therewith, and outstands from the holding segment 17 a distance sufficient to extend into a suitable socket in the male die cutter M to serve as a cutter holding guide, as will be further described. The guide post P also includes an axially centered passageway 19, which extends completely through it, wherein the pull rod 20 of hydraulic actuator A slidably extends to connect with the male die cutter M.

The actuator A is preferably, but not necessarily, an hydraulic unit including an hydraulic cylinder 21 affixed to and extending outwardly from the outer face of the disc 11 in axial alignment with, and opposite to, the guide post P. This cylinder 21 is positioned in a shallow recess 22 on the face of the disc 11 and it may be affixed to the disc in any suitable manner. A preferred mode of connection is to provide a ring of tapped holes 23 which register with the holes in the flange 15 and base 11 and which receive the bolts 16 to thereby tightly lock the entire assembly together. A piston 24 is carried within the cylinder 21 in any conventional arrangement, this piston being adapted to be driven from an initial position adjacent to the cylinder end which connects with the base 11, and to the opposite, outward end of the cylinder, as by pressurized fluid supplied to the cylinder from a line 25, extending from a pressure source and to the end of the cylinder adjacent to the base 11. Control valves, not shown, are included in this line to operate the unit. Pull rod 20, heretofore mentioned, is connected to this piston and extends from the end of the cylinder, through an axially centered hole 27 in the disc 11, through the passageway 19 in the guide post P, and beyond the guide post a distance sufficient to connect with an adjusting and pressure nut N on the male die cutter M, as hereinafter described. Accordingly, this pull rod 20 has its extended end portion threaded, as at 28, to receive the nut and is also formed with a square boss 29 at the end which permits the rod to be held, as by a wrench, whenever the unit is being turned as to make fitting adjustments, as will be described.

The male die cutter M includes a comparatively heavy, thick disc 30 having a comparatively heavy cylindrical flange ring 31 outstanding from its periphery. The outward edge of this ring 31 is formed as a serrated cutting face 32, and this face is oriented in spaced opposition to the abutment surface 12 of the female die F. The outer edge of the face 32 is formed as a sharp, leading cutting edge 33, with the face 32 being inclined inwardly from this edge. This edge 33 defines the knockout hole in plate 9 and the outer surface of the ring 31; the face 32 and edge 33 are machined and ground to selected tolerances which are adapted to permit the male die to move into the female die ring 12 with very slight clearances. Also, these portions are hardened to resist the pressures and shearing action to which they will be subjected when the die cuts through tough metal. An axially centered, cylindrical passageway 34 extends through the disc 30, and this passageway fits upon the guide segment 18 of post P with a snug sliding fit, to hold the male die M in precise axial alignment with the female die F. Accordingly, only axially directed movement of one die with respect to the other is possible, and the ring 31 of the male die will move into the closely fitting ring 12 of the female die responsive to pulling of the pull rod 20 associated with the male die M.

As indicated above, cylindrical holding nut N interconnects the male die M with the pull rod 20, and one end of this nut is formed as a precision, flat face 36 which is adapted to abut against a like precision, flat surface 37 on the outer face of the disc 30, about the passageway 34. An axially aligned, internally threaded passageway 38 extends through this nut which fits the threads 28 of the pull rod 20, so the nut may be adjustably turned upon the rod. Flats 39 are provided at one end of the nut to permit gripping with a wrench to facilitate turning it upon the threaded end of the pull rod 20. The base end of this passageway, adjacent to the face 36, is formed as an enlarged socket 40 to receive the end of the guide segment 18 of the post P whenever the actuator A operates to pull the rod 20 to move the holding nut N and male die M connected thereto, towards and into the female die.

The movement of the male die into the female die effects a cutting-out of a blank 41 from the plate 9 interposed between the dies and the formation of a knockout hole 42 in the plate. This cutting is essentially a combination of punching and shearing of metal with a lateral displacement of the blank from the plate. To minimize the force required to do this, the cutting face 32 is serrated to form a number of spaced cutting points and valleys and to provide angled shearing edges between the points and valleys and thereby require a punching action at a limited number of points only about the periphery of the knockout hole.

In a preferred construction, the cutting points are arranged in diametrically opposed pairs to balance forces against the pull rod 20 and certain pairs are varied in position with respect to the direction of cutting movement. This is to minimize the variation of force as a cutting operation proceeds, because the force required to punch a hole in the plate, as with a cutting point, is considerably more than the force required to continue to cut, i.e. shear, with the inclined edges after the point has moved through the plate.

The improved arrangement, as illustrated in FIGS. 5 and 6, contemplates four primary, leading cutting points 43 which are spaced at 90 degrees apart, as two diametric pairs, and which are at the same position with respect to the direction of cutting movement to contact the plate simultaneously and produce a balanced reaction as the pull rod 20 commences to move the male die M into the plate. It will be understood, of course, that there may be only three or more than four primary cutting points, which are preferably spaced equally about the periphery of the male die. At equally divided spaces between the primary leading points, there are the same number of secondary, trailing cutting points 44, which are likewise 90 degrees apart, as shown, but are equal in number to the primary cutting points. These secondary points trail the leading points an axial distance, preferably equal to the thickness of the metal to be cut, sufficient to permit the primary points to move substantially through the plate before the secondary points bite into the metal. Another advantage of the arrangement is that, when the secondary cutting points are coplanar, if the male die is even slightly tipped, so that one secondary cutting point 44 engages the metal before the others, the resistance of the metal, as this secondary cutting point enters it, is sufficient to cause the pull rod 20 to move the remaining secondary cutting points to the plate, thereby repositioning the male die in more accurate alignment.

The cutting edge 33 which slopes from each cutting point away from the direction of movement forms primary troughs 45 and secondary troughs 46 between the respective cutting points. The cutting forces are necessarily increased at these troughs, being on the same order of the force required to cause cutting points 43 or 44 to punch through the plate, but by varying the respective positions of these troughs, it is possible to minimize the maximum force on the pull rod. Preferably, the axial distance between secondary cutting points 44 and primary troughs 45, as well as between primary troughs 45 and secondary troughs 46, is again approximately equal to the thickness of the metal, so that the secondary cutting points 44 will have substantially punched through the metal before primary troughs 45 begin to punch through the metal and, similarly, primary troughs 45 will have substantially cut or punched through the metal before secondary troughs 46 begin to punch through the metal. The troughs also tend to correct any misalignment of the dies, since if one primary trough 45 or secondary trough 46 begins to be pulled through the metal before the others, the increased load at that point will tend to cause the remaining troughs of the set to be moved faster, thereby straightening the male die. In the arrangement shown, four primary troughs 45 are positioned at 90 degrees apart, disposed closer to secondary cutting points 44 than primary cutting points 43, and on the corresponding same side of the latter, with four secondary troughs 46, at 90 degrees apart, again closer to the secondary cutting points but on the opposite side from the primary troughs. This arrangement of the troughs provides a longer shearing edge on each side of each primary cutting point 43, which punch through the metal first. As will be evident, the number and arrangement of the cutting points and troughs may be varied, such as a greater or lesser number of cutting points and troughs in each set, or a greater number of sets of cutting points and troughs, such as primary, secondary and tertiary sets of each, for cutting still larger holes in thicker plate, with the axial distances between sets again approximately the thickness of the metal to be cut. Thus, the maximum force required is that for causing only one set of cutting points or troughs to cut or punch through the metal, at times slightly increased by the shearing action taking place simultaneously.

In further accordance with my invention, an annular shaped block 48, or series of rings, is placed in the cavity of the female die, block 48 being formed of a resilient, relatively incompressible material, such as rubber. One function of block 48 is to help eject the blank 41 from the female die once it is cut, but possibly a more important function is that of deforming the blank 41 so that it will neither bind in the female die F nor on the post P. Since rubber is comparatively incompressible, although it will easily yield under pressure, the outer edges of block 48 will be compressed as the male die M moves into the female die F. This compression at the outer edges forces the rubber into or toward the center, producing pressures upwardly against the blank 41, as it is being formed, which bow it upwardly at the center. This bowing not only pulls the outer edges of the blank inwardly from the inside of female die F, after the edge portions of the blank have been sheared from the plate, but also pulls the edge of pilot hole 10 away from post P to form a larger hole 49 in the blank, which is sufficiently larger than post P that the blank can readily be removed without binding on post P. For instance, in cutting a hole 8.75 inches in diameter from a stainless steel plate ⅟₁₆ inches thick, the diameter of blank 41, at the position of primary cutting points 43, was reduced to 8.5 inches, while the diameter of pilot hole 10 was initially 2.495 inches, but was increased to 2.507 inches at blank hole 49.

Figure 3:
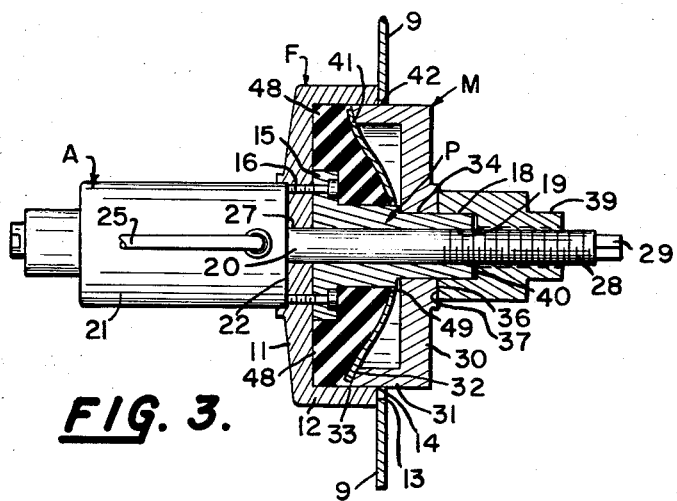
FIG. 3 is an offset section, similar to FIG. 2, but with the elements of the die being intermeshed after a large diameter knockout hole has been cut in the sheet metal.

Operation of the knockout die is a simple matter. After a pilot hole 10 is drilled in a plate 9, the knockout die is set in position, with the female die F being on one side of the plate and the male cutter die M being at the other side. The cutter die M is secured to the post P by the nut N which is screwed onto the pull rod 20 until the two dies M and F bear snugly against the plate. Fluid is then introduced through the pressure line 25 to move piston 24 and pull the male die M into the female die F to effect the cutting out of the blank 41, as in the manner illustrated at FIG. 3. The consecutive punching through of the primary and secondary cutting points 43 and 44, then the primary and secondary troughs 45 and 46, accompanied by shearing by edges 33 therebetween, is accompanied by deformation of the blank 41 to pull the outer edges of the blank away from the inner edge of female die F and the edge of the pilot hole away from post P as described above. The entire die may be removed from the plate by a simple pulling of the male die through the hole 42, after the hydraulic pressure has been released. Then, nut N may be unscrewed, male die M removed and the piece 41 cut from the plate 9 simply lifted out, since rubber block 48 will force the latter outwardly. As will be evident, the post P may be inserted in another pilot hole 10 for the next hole to be cut and the operation repeated. In the event pilot hole 10 can be accurately positioned, it may be used to center the die, since the deformation of blank 41 by block 48 enlarges the pilot hole as the blank is formed, thereby preventing the blank from binding on post P during removal. Otherwise, pilot hole 10 would need to be enlarged and the die centered after assembly on the plate. Piston 24 in actuator A may be double acting, if desired, but is conveniently single acting, since nut N may be used to force excess fluid from the actuator, as it is tightened.

The alternate construction illustrated in FIGS. 7, 8 and 9 provides for making a non-circular type of hole which is elongated in form. In the construction illustrated, the female die F' and male die M' are adapted to cut a rectangular hole in a plate, which hole is substantially longer than wide. However, the parts and components of each portion of the die are substantially the same as that heretofore described and are thus indicated by primed numbers. Because of the length of the periphery and the elongated form, however, a pair of actuators A' are used to pull the male die M' through the plate 9' and into the female die F', and these actuators, adapted to operate in unison, are positioned within the dies at locations which effectively balance the cutting forces. With a regular, geometrically shaped hole, such as rectangular, elliptical, or the like, the positioning of the actuators is a simple matter. However, where the shape of the hole is irregular, the proper location of two or more actuators becomes a matter of computation and perhaps even trial and error. Based upon each actuator pulling a like amount in a balanced manner, the location of the actuators in an irregular shaped die is substantially at the geometrical center of gravity of corresponding portions of a line outlining the form of the die itself. The same principles may also be applied to a hole of regular shape, i.e. for a rectangular die utilizing two actuators A', as shown, the two posts P', as in FIG. 8, are located closer to the ends than to the center of the die, with corresponding locations of the actuators and posts for other peripheral configurations of the hole and dies.

The female die F' includes a base disc 11', a ring 12' having an abutment 13' and a cutting edge 14', similar to that heretofore described, but rectangular rather than circular in peripheral shape. Guide posts P' are secured to the base in the same manner and each includes a holding segment 17' and a guide segment 18'. It is to be noted that two pilot holes 10' must be cut in the plate 9' to receive these two guide posts. A pull rod 20' having threads 28' at the outer end for engagement by a nut N', extends through each post P' from the corresponding actuator A'. The male die M' includes a base disc 30' having a flange 31' thereabout provided with a serrated face 32' having cutting edges 33' with a pattern of primary and secondary points 43' and 44' arranged in a balanced manner about the perimeter of the die, and like patterns of primary and secondary troughs 45' and 46' arranged in a like balanced manner, so that all points and troughs will not cut into the plate P' at the same time and will also do so in a balanced manner. For instance, a primary cutting point 43' may be located at each corner and at the midpoint of each longer side, with a secondary cutting point 44' at the midpoint of each end and midway between each corner and the primary point at the center of each side. Also, a primary trough 45' may be located adjacent each secondary point 44', on the clockwise side thereof, and a secondary trough 46' on the opposite side thereof. As will be understood, other arrangements of the points and troughs may be utilized, particularly for other and different peripheral shapes, corresponding to the shape of the hole to be made.

The actuators A' are motivated by fluid under pressure and, in the arrangement shown, a line 25' bifurcates, as at a T 51, to provide independent lines 52 and 53 at each side of the T to provide a parallel operative arrangement. However, it is to be noted that a series arrangement of lines may be desirable, and such arrangement consists of a line extending to the base of one cylinder, with another line extending from the inner end of that cylinder to the base of the second cylinder. In the latter instance, the diameter of the two cylinders should be modified, so that the fluid moving from one to the other will cause them to move in strict unison. This arrangement is not shown because it is conventional in hydraulic cylinders to be operated in unison.

A block 48', or series of rings of rubber or other suitable material, is placed in the cavity of die F', as before, the thickness thereof being equal to the thickness of the die cavity. As before, the block 48' will deform the blank cut from plate 9' to pull the outer edges of the blank away from the inside of die F' and also to enlarge the pilot holes in the plate, so as to avoid binding on post P' upon removal of the blanks, on three sides of post P', i.e. the sides facing the ends and sides of the dies. However, on the side of each post P' facing the opposite post P', deformation by block 48' will tend to push the edge of each pilot hole against each post P'. To produce clearance for the holes on the facing sides of each post P', a cone shaped block 54 may be attached to the center of male die M', as by a bolt 55, to produce an indentation at the center of the blank, to pull the edge of each pilot hole away from the facing edges of the posts P'. Thus, the pilot holes can be sufficiently enlarged completely around each post P' to avoid binding on either post during removal. The lower end of block 54 is preferably rounded or has rounded edges, since the purpose of block 54 is not to punch through the plate, but merely to deform it. As will be evident, block 54 may be altered in shape, such as being elongated in a direction transverse to the center line of the posts P', while more than one block may be utilized. Thus, when the contour of the hole to be cut out of plate 9' is irregular, i.e. non-asymmetric about all axes, and the position of two or more posts P' is asymmetrical, the position of the central deforming blocks, i.e. between two or more posts, or the number of deforming blocks, may be varied to achieve the desired result, i.e. deform the blank so as to cause the compressed, resilient block underneath to enlarge the pilot hole at facing sides of two or more posts P'. It will be understood, of course, that if the two pilot holes 10' cannot be conveniently punched or drilled with sufficient accuracy to position the knockout die on the plate, then the pilot holes should be made larger, so that the die can be positioned accurately after assembly on the plate. With such larger holes, the deforming block 54 may be unnecessary, although the resilient block 48 should be used, not only to cause the outer edges of the blank to be pulled away from the inside edge of the female die, but also for ejection. However, there may be an irregular shape, having a reentrant curve, for instance, with which a deforming block can be utilized adjacent the reentrant curve, to pull the edge of the blank at that curve away from the inner edge of the female die, when the normal action of the resilient block is not to do so.

Two embodiments of this invention have been described in considerable detail. However, it is evident that others skilled in the art can build and design alternate and equivalent constructions which are nevertheless within the spirit and scope of this invention.

What is claimed is:

1. A knockout die, adapted to cut a hole in a sheet metal member having a smaller pilot hole therein, by mating male and female die members at opposite sides of the plate interconnected through the pilot hole, comprising in combination with mating male and female dies formed as opposing cup-shaped members adapted to intermesh by telescoping together to cut out a blank and form a hole in the sheet metal member:
   (a) at least one tubular guide post outstanding from one die member to extend beyond the member and through the pilot hole when said die members are placed against opposite sides of the metal sheet;
   (b) an axially-centered passageway in the other said die member for each said post, whereinto said post is adapted to slidably extend with a snug fit to hold the two die members in common axial alignment and facilitate their intermeshing when they move together;
   (c) an actuator means carried on one die member for each guide post; and
   (d) a rod adapted to extend from each said actuator means and centrally through the corresponding tubular guide post and to engage the other die member, said actuator means being adapted to pull the rod and thereby forcibly move the die members together.

2. A knockout die as set forth in claim 1, wherein said hole to be cut is circular, including one guide post axially centered.

3. A knockout die as set forth in claim 1, wherein said hole to be cut is non-circular, including a plurality of guide posts disposed at positions corresponding to the center of gravity of the line of cut of an equal length of line of cut for each said guide post.

4. A knockout die as set forth in claim 1, including a comparatively incompressible, resilient, flowable means filling the cavity of said female die and adapted to engage the blank cut from said metal plate member as said blank is moved into said female die by said male die.

5. A knockout die as set forth in claim 4, including a plurality of guide posts, actuator means and pulling rods; and
   a member attached to said male die between two of said guide posts for deforming said blank between said guide posts as said male die moves into said female die.

6. A knockout die adapted to cut a hole in a sheet metal member having a smaller pilot hole therein, by mating male and female die members at opposite sides of the plate interconnected through the pilot hole, comprising, in combination with opposing cup-shaped male and female die members which are adapted to intermesh by telescoping together to cut out a blank and form a hole in a sheet metal member between them:
   (a) at least one tubular guide post rigidly attached to and outstanding from one die member and being adapted to extend through the pilot hole when the die member is placed against a metal sheet;
   (b) an axially-centered passageway in the other die member adapted to telescopically receive the end of the guide post with a snug slidable fit when the second member is placed against the opposite side of the metal sheet;
   (c) an actuator means on the first said die member opposite each tubular guide post;
   (d) a rod adapted to extend from said actuator means through the tubular passageway of the corresponding guide post; and
   (e) tension means on the extended end of said rod and adapted to bear against the second said die member, whereby actuation of the actuator means effects a pulling together of the die members and slides the second said die member along the guide post to maintain its alignment with respect to the first said die member.

7. A knockout die as set forth in claim 6, wherein said tension means includes a socket adjacent to the second said die member, said socket being adapted to receive the projecting end of the guide post in close fitting relation as the rod pulls said die member along said guide post.

8. A knockout die as set forth in claim 6, wherein said tension means threadedly engages the pull rod and is adapted to be turned thereon to take up operational slack in the die.

9. A knockout die as set forth in claim 6, wherein said female die member has a flat planar face adapted to bear flatly against the plate to minimize distortion of the plate about a hole being cut therein, the inner edge of said planar face being a cutting edge.

10. A knockout die as set forth in claim 6, wherein said female die member includes a cutting edge and a flat planar face normal to the axis of the die and adapted to bear flatly against the plate during cutting of the hole therethrough; and
 wherein said male die member has a serrated cutting edge having points and valleys and inclined shearing edges between the points and valleys.

11. A knockout die as set forth in claim 10, wherein the points and valleys alternate in position with respect to the axis of the male die member.

12. A knockout die, adapted to cut a relatively large circular hole in a metal plate having a smaller pilot hole therein, comprising:
 (a) a cup-shaped, cylindrical female die having a disc-like base, an axially-centered passageway through the base and an axially extending flange about its periphery with the end of the flange forming a flat abutment surface normal to the axis of the die and the inner corner edge of such surface forming an inward cutting edge;
 (b) an opposing cup-shaped, cylindrical male die having a disc-like base with an axially-centered cylindrical passageway therethrough and an axially extending flange about its periphery adapted to snugly telescope into the female die flange, with the outward end of the flange provided with a plurality of inwardly inclined surfaces having outward cutting edges adapted to move past the inward cutting edge of the female die with close tolerance, said cutting edges being alternately inclined to a plane perpendicular to the axis of said die and forming at least two series of points and two series of valleys, said series of cutting points and said series of valleys being spaced apart in an axial direction by approximately the thickness of the metal to be cut in the order of a first cutting point, a second cutting point, a first valley and a second valley;
 (c) a rigid, tubular guide post rigidly affixed to the base of said female die at the axial center thereof with an axially-centered passageway extending through the post and through the base portion, and with the extended end of said post slidably fitting into the passageway at the axial center of the male die to hold the dies in common axial alignment, and with said male die being slidable along said guide post to permit the respective flange portions to move together and into shearing or cutting interengagement;
 (d) an axially-centered, hydraulic traction means mounted on said female die opposite the guide post;
 (e) a pull rod extending from said traction means through said guide post;
 (f) a connecting nut on the extended end of said pull rod and having a flat surface adapted to engage said male die and to move said male die along said guide post responsive to pulling of said rod by said traction means and a socket closely fitting said guide post and movable thereon, the extended end of said pull rod being threaded, and said nut being adjustably turnable thereon to shift the initial position of the said male die with respect to said female die for preliminary tightening of the dies upon said plate; and (g) comparatively incompressible, resilient, flowable material filling the cavity of said female die around said guide posts for engaging the blank cut from said plate to deform said blank by pushing against the portion thereof around said guide post, thereby moving the outer edges of said blank away from the flange of said female die and enlarging said pilot hole about said guide post.

13. A knockout die adapted to cut a relatively large, non-circular hole in a metal plate having a plurality of smaller pilot holes therein, comprising:
 (a) a cup-shaped female die having a disc-like base, a plurality of axial passageways through the base and an axially extending flange about its periphery with the end of the flange forming a flat abutment surface normal to the axis of the die and with the inner corner edge of said surface forming an inward cutting edge conforming in shape to the hole to be cut;
 (b) an opposing cup-shaped male die having a disc-like base with a plurality of axial cylindrical passageways therethrough and an axially extending flange about its periphery adapted to snugly telescope into the female die flange, with the end of the flange provided with a plurality of inclined surfaces having outward cutting edges adapted to move past the inward cutting edge of the female die with close tolerance, said cutting edges being alternately inclined to a plane perpendicular to the axis of said die and forming a plurality of series of cutting points and a plurality of series of valleys, said cutting points and said valleys being disposed in alternating positions around the periphery of said flange and said series of cutting points and said series of valleys being spaced apart in an axial direction by approximately the thickness of the metal to be cut, whereby each series of cutting points enters the metal when a previous series of cutting points is substantially through the metal, said first series of valleys engages the metal when the last series of cutting points is substantially through the metal and each remaining series of valleys engages the metal when the previous series of valleys is substantially through the metal;
 (c) a rigid, tubular guide post adapted to be rigidly affixed to the base of said female die at the axial center of each passageway thereof and having an axially-centered passageway extending through the post, with the extended end of the post being adapted to slidably fit into the passageway at the axial center of said male die to hold said dies in common axial alignment and with said male die being adapted to slide along the post to permit the respective flange portions being adapted to move together and into shearing interengagement, each said guide post being disposed at approximately the center of gravity of an equal length of line of the hole to be cut and said pilot holes being placed in positions corresponding to said guide posts;
 (d) hydraulic traction means mounted on said female die opposite each said guide post;
 (e) a pull rod extending from each said traction means through the corresponding guide post;
 (f) a connecting nut at the extended end of each pull rod having a flat surface adapted to engage the said male die and to move said male die along the post responsive to pulling of said rod by said traction means and a socket closely fitting said guide post and movable thereon, the extended end of said pull rod being threaded and said nut being adapted to be adjustably turned thereon to shift the initial position of said male die with respect to said female die for preliminary tightening of said dies upon said plate; and
 (g) comparatively incompressible, resilient flowable material filling the cavity of said female die around said guide posts for engaging the blank cut from said plate to deform said blank by pushing against the portions of said blank inwardly from said flange of said male die, thereby moving the outer edges of said blank away from the flange of said female die.

14. A knockout die as set forth in claim 13, including means extending from the disc of said male die and intermediate at least two of said guide posts, for deforming said blank as said male die moves into said female die, whereby said pilot holes are enlarged on the sides of said guide posts facing each other.

References Cited by the Examiner

UNITED STATES PATENTS

| 1,817,223 | 8/1931 | Abramson et al. | 30—360 |
| 2,096,778 | 10/1937 | Azer | 30—360 |
| 2,237,069 | 4/1941 | Christenson | 30—360 |
| 2,633,197 | 3/1953 | Nischan | 30—360 |

WILLIAM FELDMAN, *Primary Examiner.*

G. WEIDENFELD, *Assistant Examiner.*